United States Patent [19]

Purdy

[11] Patent Number: 4,498,560
[45] Date of Patent: Feb. 12, 1985

[54] EMERGENCY STOPPING BRAKE SYSTEM FOR TRACTORS AND TRAILERS

[76] Inventor: Ronald R. Purdy, 4288 Manor La., Ellicott City, Md. 21043

[21] Appl. No.: 470,765

[22] Filed: Feb. 28, 1983

[51] Int. Cl.³ .................... F16D 55/38; F16D 66/00
[52] U.S. Cl. .................... 188/1.11; 188/18 A; 188/71.4; 188/71.5; 188/71.7; 188/72.7; 188/196 M
[58] Field of Search ............. 188/1.11, 17, 18 R, 188/18 A, 71.4, 71.5, 71.7, 72.3, 72.7, 72.8, 72.9, 73.2, 73.46, 196 M, 71.8, 71.9; 301/6 R, 6 E

[56] References Cited

U.S. PATENT DOCUMENTS

| 1,315,236 | 9/1919 | Parker | 188/18 A X |
| 2,016,359 | 10/1935 | Corbin, Jr. | 188/71.5 |
| 2,551,448 | 5/1951 | McGuire | 188/18 A |
| 2,711,261 | 6/1955 | Butler | 188/73.2 X |
| 2,925,889 | 2/1960 | Albright | 188/71.5 |
| 2,955,683 | 10/1960 | Kelly | 188/18 A |
| 3,182,756 | 5/1965 | Hawley et al. | 188/1.11 X |
| 3,502,180 | 3/1970 | Aiki et al. | 188/1.11 X |
| 4,102,438 | 7/1978 | Rancourt | 188/18 A |
| 4,152,787 | 5/1979 | Meggyesy | 188/72.7 X |
| 4,294,334 | 10/1981 | Shinoda et al. | 188/71.5 X |
| 4,391,351 | 7/1983 | Jirousek et al. | 188/18 A |

Primary Examiner—Douglas C. Butler
Assistant Examiner—Richard R. Diefendorf
Attorney, Agent, or Firm—John F. McClellan, Sr.

[57] ABSTRACT

A system for braking axle-attached wheels of a tractor trailer and the like includes first and second arrays of discs symmetrically opposed about the centerline of a tubular axle containing the arrays of discs; symmetrical also in each array of discs is a first plurality of discs slidably attached to the axle and a second plurality of discs slidably attached to the housing; the axle comprises a stub axle at each end protruding from the housing in position for mounting a wheel or wheels; in braking, a two-lobe, cam-actuated system simultaneously compresses the respective arrays of discs in directions opposite each other for frictional retardation of the axle; bearings carry the axles; the cam actuated system includes a spreader plate driving a pressure plate on each side of centerline.

9 Claims, 11 Drawing Figures

EMERGENCY STOPPING BRAKE SYSTEM FOR TRACTORS AND TRAILERS

FIELD OF THE INVENTION

This invention relates generally to land vehicle brake systems and particularly to a disc brake system for tractor trailers and the like.

BACKGROUND OF THE INVENTION

Various disclosures of disc braking system have been made as indicated by the following patents.

U.S. Pat. No. 1,315,236 issued to C. W. Parker on 9-9-19 discloses a housing containing a set of disc brake structures on each side of the center. A mechanical brake-actuation pivotal mechanism (FIG. 5) evidently balances the braking action between the two sets of disc brakes.

The ends of the axles can drive the vehicle wheels through gearing, but evidently this could be a straight drive without changing the principle of this particular device.

U.S. Pat. No. 2,551,448 issued to F. R. McGuire on 5-1-51 discloses mechanically actuated disc brakes, but at the wheels.

U.S. Pat. No. 2,955,683 issued to O. K. Kelly on 10-11-60 discloses disc brakes on the wheel shafts.

U.S. Pat. No. 4,102,438 issued to Y. Rancourt on 7-25-78 is representative of many other patents on disc brakes but appears not particularly pertinent other than in the general relation of the fixed and rotating members.

SUMMARY OF THE INVENTION

The following reflects the inventor's observations.

Since back in the '30's, the brakes have been basically the same on tractors and trailers—drum and shoe brakes. This type of brake has been used all this time with very little change. But over the years, the laws have changed, and the interstate highways have been built. These allow the tractors and trailers to haul much heavier loads, and tractors and trailers to move along at a much greater speed and for longer periods of time without slowing down.

But when it is raining and the roads are wet, the linings and drums on the brakes now in use get wet, and will not hold at all until they dry out. If a tractor and trailer is travelling on the interstate system and is moving along at 40 or 50 or 60 miles per hour, and the driver has to stop or slow down, he applies his brakes, and the brakes will not hold. This tractor and trailer can travel at least one-eighth of a mile before the brakes are dry enough to start holding at all, even if the drums and linings are new, and are adjusted perfectly. This causes many accidents and the loss of many lives.

With the same tractor and trailer moving through a rural area or city street, the driver must keep a little pressure on his brake pedal before coming to an intersection or red light in order to keep the brakes dry enough to stop if he has to. If he doesn't, and he comes up to a red light at 25 miles per hour, he will pass through the intersection.

Now imagine the same tractor and trailer with new brake linings and new drums which are perfectly adjusted—the tractor and trailer is loaded lightly—60 to 70 thousand pounds, moving across one of the mountain ranges in our country (the Appalachians or Rockies or Sierra Mountains). It might also be moving across a summit (Fancy Gap in North Carolina; Flat Top in West Virginia, Loveland Pass, Vail or Wolf Creek Pass in Colorado; Techachapi Pass in California; Dead Man's Pass in Oregon; Emigrant Pass in Nevada; Vale Mountain west of Cumberland, Md.). The driver starts down at 25 miles per hour, and the grade is running rom 6% to 8%; it's 6 to 12 miles to the bottom. The traffic is "running heavy" and the driver uses his brakes to stay back from a camper or a car, and if he holds them for $\frac{1}{8}$ to $\frac{1}{4}$ of a mile the brakes are hot, and this tractor and trailer is headed for the bottom, and there is no way of stopping it. It will clean out everything in front of it.

The State Highway Departments provide RUN-AWAY RAMPS at certain points, either way, to the bottom or over the side; this will end in disaster. There have been thousands of tractor and trailer drivers killed in our country and families run over, property destroyed, et., simply because the brakes in use today will not stop the vehicles in the situations listed above.

There are six companies that make and sell retarders for tractors. These systems work on the tractor and only work effectively on dry roads, and then, still give only partial hold-back, and will not stop the tractor and trailer, if they are used on wet or icy roads, as this will cause the tractor and trailer to jackknife.

One company recently came out with a retarding axle, Ilasa International Marketing, P.O. Box 6116, Monroe, La. 71203. Ilasa's electro-magnetic unit is a complete axle assembly to be mounted on the trailer. It has a large armature inside the trailer axle housing, with shafts running to the brake hubs, which are hooked to a planetary gear. This turns the armature at a higher R.P.M. than the trailer wheels are turning. The armature holds back on the shafts.

This system has the complexity of electrical wiring, planetary gears and shafts. Also, this system will not stop the tractor and trailer—only slow it down—and the weight is in excess of 900 pounds per axle.

Although the general concept of disc brakes in association with stub axles in housings appears known, no such mechanisms have become the standard of the industry for the purpose, and to provide such is a principal object of this invention.

Further objects are to provide the strongest and simplest possible unitary system as described for the weight and size, which can bring a tractor and trailer to a straight smooth stop without jack-knifing in almost any situation, which is self-cooling and comprises a sealed system that cannot get wet, freeze up or burn, is no hazard with flammable or explosive loads, and has no electrical parts.

Still further objects are to provide a system as described which is quick and easy to rebuild but is substantially maintenance free in normal use, that is wear resistant, balanced in operation for equal traction on all trailer wheels, substantially failsafe, easy to operate, convenient and easy to assemble, adjust and maintain, and which is adaptable to embodiment in any of a variety of sizes.

Yet further objects are to provide a system as described that can be used to replace old brake systems simply by switching axles, that adds only 200 to 250 pounds (91 to 113 kg) of extra weight, that can be conveniently hooked into the driver's trolley handle if desired; that can be used as the main brake system, eliminating need for other trailer brakes, with no loss in braking power, and that, in addition to saving lives and property damage, can eliminate the need for run-away ramps on future highways.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
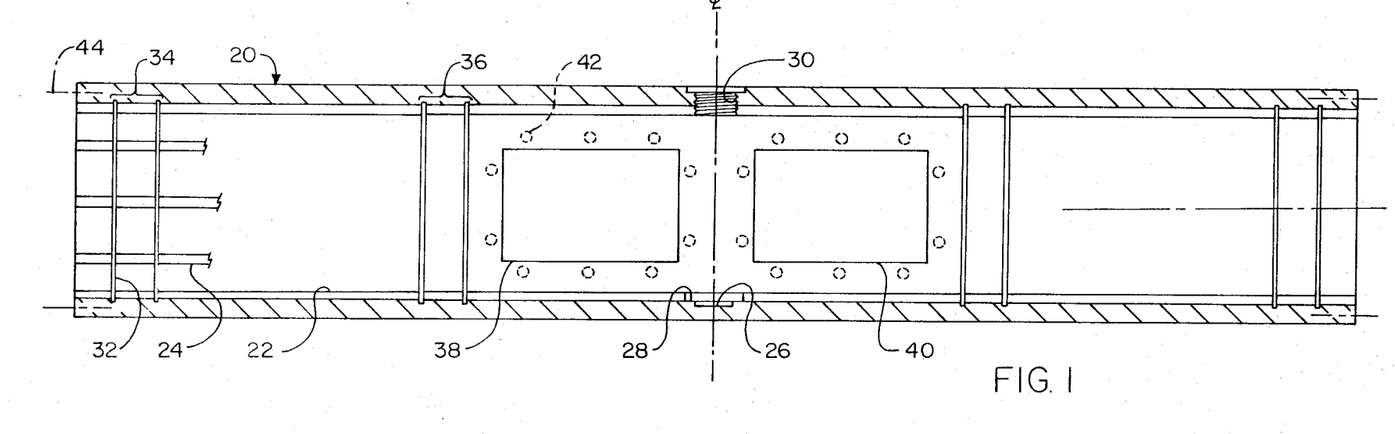
FIG. 1 is a longitudinal sectional view of a housing.
Figure 2:
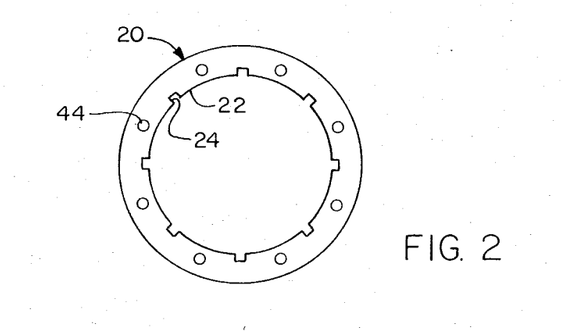
FIG. 2 is a typical end view thereof.

FIGS. 1 and 2 show the housing of the invention in top plan sectional view and in end view, respectively. Housing 20 may be for economy, strength, simplicity and ease of fabrication, assembly and repair, a thick-wall cylindrical steel tube, symmetrical about the centerline CL and of appropriate diameter and length to serve as axle housing in a semi-trailer or a trailer part of a tractor trailer.

The bore 22 or inside circumference of the housing has continuous parallel-side broached splines 24 (shown fragmentarily) throughout the length. Eight of these, equally spaced, is the preferred number.

On the transverse centerline C-L first and second diametrically opposed coaxial recesses are supplied. The first is a blind bearing journal or socket 26; this may be conventionally lined with bronze or babbit if desired, without protrusion, and preferably has a concentric spotface 28 for clearance.

The second recess is a tapped hole 30 through the opposite wall of the housing, and is larger in diameter than the journal 26.

The housing bore has recessed in it circumferential snapring grooves 32 in two pairs 34, 36 on each side. The pair 36 on each side is spaced from the centerline about halfway to the end of the housing and the pair 34 is adjacent the end of the housing.

A window or access opening may be provided adjacent the centerline on either side at 38, 40 and preferably in alignment axially of the housing. The margins of the openings are provided with blind-tapped holes 42 for securance of appropriate cover plates to be described. Each end of the housing may have a plurality of tapped holes, 44 indicates centers, axially in the wall. Eight at each end may be provided.

From the foregoing the striking simplicity of the housing will be apparent. Beginning with a standard length of tubing, fabrication requires only one broaching operation, one transverse drilling (or milling) operation with counterbores, one tapping in the transverse operation, eight boring operations for the snapring circumferential recesses in the inner circumference, eight drilling and tapping operations in each end, a milling operation for the two window openings, and a blind tapping operation providing for securance of cover plates along the margins of the window opening, which may conform to the tubing round-section.

Figure 3:
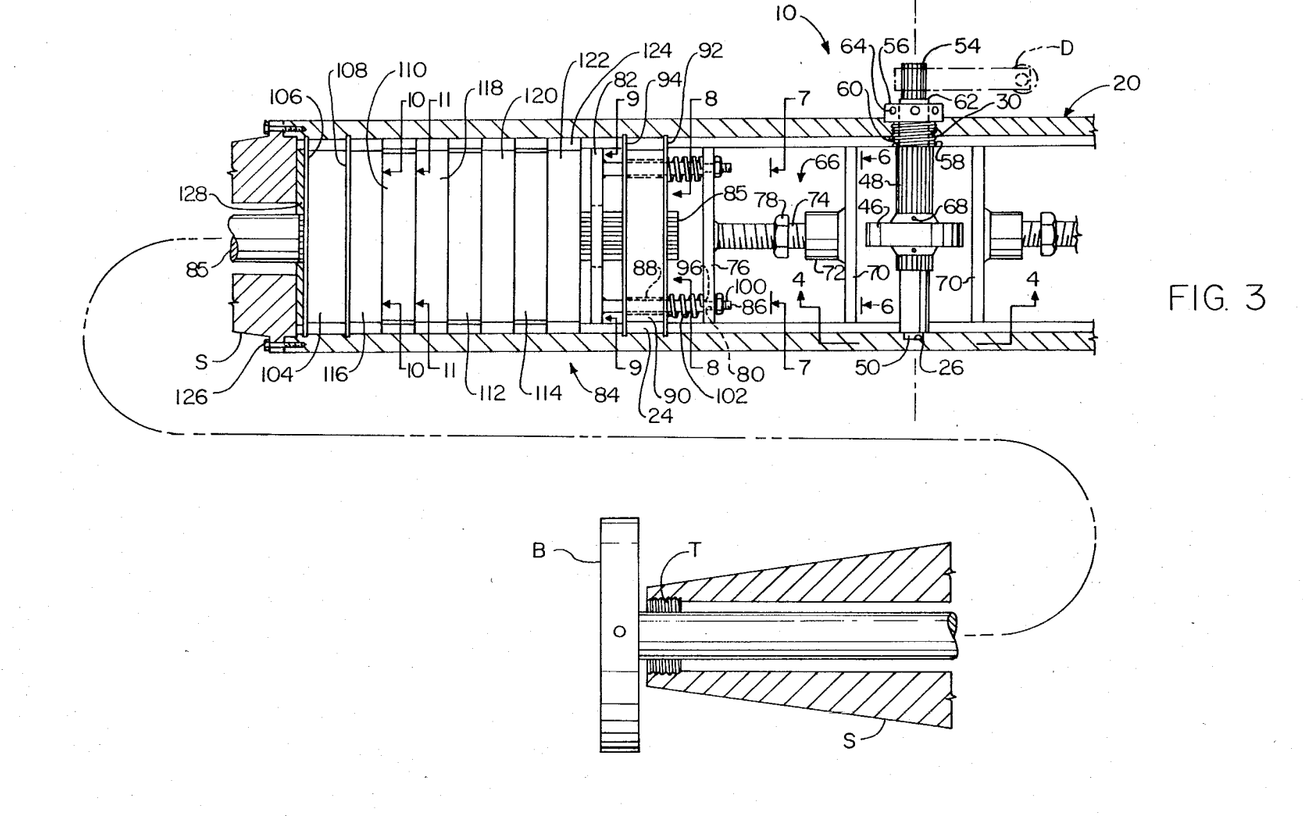
FIG. 3 is a partially sectional longitudinal diagram of an assembly according to this invention.
Figure 4:
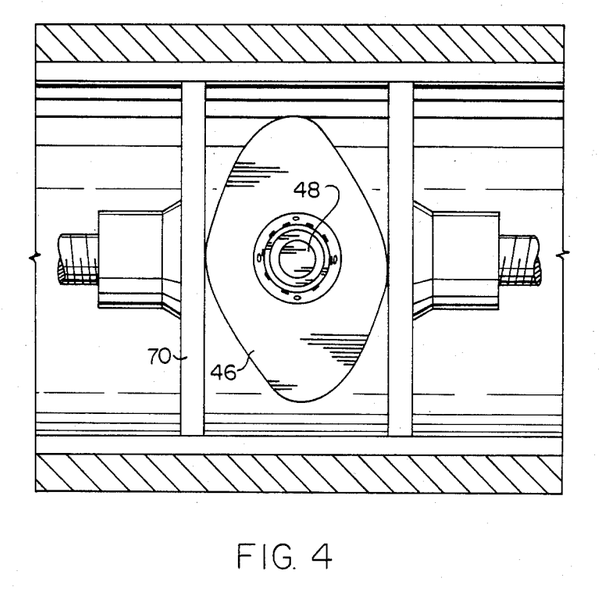
FIG. 4 is a view adapted from 4—4, FIG. 3.

FIG. 3 diagrams in partial-length sectional view the embodiment 10 of this invention with elements assembled with the housing 20 (fit to the cam 46 is as in FIG. 4).

Like the housing, this assembly is preferably symmetrical about the centerline C-L, with parts from either side interchangeable with like parts from the other side.

On the centerline a cam 46 is fixed in the housing on a splined cam shaft 48 having a first end 50 in journal 26 and a portion 62 near the second end journalled in sleeve 56.

The sleeve has a threaded periphery 58 fitting the tapped hole 30 and a shoulder 60 of the cam shaft rests against the inner face of the sleeve, with a smaller diameter portion 62 of the shaft passing through the sleeve and a yet smaller diameter portion 54 of the shaft forming the second end of the cam shaft.

The threaded sleeve may be adjusted by means of spannerwrench holes 64 in a flange portion of the sleeve to adjust the end-play in the shaft 48. The end 54 of the cam shaft may be used to connect to any suitable driver D (phantom lines) or power operated actuator for turning the cam shaft when desired to apply brakes. This may be a hydraulic piston drive.

As will be explained, an adjustable cam-follower subsystem 66 applied brakes in response to cam actuation.

Turning shaft 48 rotates the two-lobe cam 46, fixed on the splined shaft portion as by press-fit or by set screws 68 which thrusts apart, with equal force on each, the two cam discs, 70, symmetrically disposed on opposite sides of the cam.

Each of the cam discs freely slides, under urging of the cam, through the bore of the housing. The cam discs are circular members and do not engage the splines in the housing; if they did they would not be adjustable because they must turn for adjustment. The assembly is shown in process of adjustment.

For adjustment, each cam disc has an internally threaded hub 72 engaging external threads on a threaded adjustment rod 74, coaxially fixed on a respective spreader plate 76. Turning a cam disc changes the distance between it and a respective spreader plate 76. When the adjustment is made, a lock nut 78 on the adjustment rod 74, can be jammed against the cam follower, disc hub 72 to fix the spacing adjustment between cam follower disc and spreader plate.

Each spreader plate 76 may be a disc, circular and unsplined and freely fitting the bore of the housing 20. Each spreader plate preferably has four equally spaced holes 80 through it adjacent the perimeter, but need only have two; the extra holes are for convenience in assembly.

As will be described, function of each of the two symmetrically disposed spreader plates is, by means of a pressure plate 82, to force together a respective coaxial array 84 of brake discs or friction discs, alternate brake discs of which are slidably splined to the housing 20. The remaining brake discs are slidably splined to a respective trailer-wheel mounting stub axle 85.

Forcing the brake discs together brakes the rotating axle by retardingly coupling it to the non-rotating housing.

To force each array of brake discs together, applying the brakes, each spreader plate 76 connects to a respective pressure disc 82 or pressure plate by means of a pair of pressure plate rods 86 fixed to the pressure disc at diametrically opposite points adjacent the periphery. The pressure plate rods extend to the spreader plate in a direction parallel with the housing, each through a hole 88 in a first axle carrier bearing assembly 90 which is held axially by snap rings 92, 94 in the inboard pair of grooves. The circumference is splined to the housing bore (90 to 24). The brake-application force-transmitting shoulder 96 is on each pressure plate rod between the spreader plate 76 and a reduced portion of each pressure plate rod that passes through a respective hole 80 in the spreader plate and terminates in a threaded end portion 100 with self-locking nut retaining it to the spreader plate.

A cam follower retraction spring in the form of a compression spring 102 on each pressure plate rod between the bearing assembly 90 and the spreader plate 76, biases the cam follower assembly toward the cam 46 at all times, releasing pressure on the brake disc array 84 when braking is not wanted, eliminating possibility of dragging brakes when the brakes are not applied.

When the brakes are applied, the cam follower system 66 axially forces pressure plate 82 against the brake disc array 84. Second axle carrier bearing assembly 104 opposes the force, compressing the brake disc array 84. The second bearing assembly 104 is held in place by snap rings 106, 108, in the grooves provided adjacent the end of the housing.

Braking forces are transmitted to trailer-wheel-mounting stub axle 85 as follows.

The stub axle is splined throughout the portion extending from the second bearing assembly 104 to the inboard end or free end.

For slidable attachment, the stub axle splines are proportioned for engaging mating splines in the inner race of the first bearing assembly 90, and the bores of axle brake discs, the first plurality of discs, 110, 112, 114, and the inner race of the second bearing assembly 104, but they are clear of the bores of the housing brake discs, the second plurality of discs, 116, 118, 120, 122. The axle brake discs can slide freely along the axle and can rotate in the housing. The outer circumferences of the housing brake discs have splines 124 proportioned for engaging the splines 24 in the housing 20 and the housing brake discs can slide along the housing splines.

The pressure plate 82 clears the stub axle and the housing at bore and circumference respectively. Backing plate B for trailer wheel mounting to the outer end of the stub axle is conventional, and may be associated in any usual manner with a conventional tapered member S or fixed spindle secured by bolts 126 to the housing end. Threads T in the fixed spindle provide for a thrust bearing for retaining the stub axle. A gasket 128 conventionally forms an oil seal between stub axle 85 and tapered member S. The housing may be filled to about two-thirds capacity with hydraulic oil for lubrication and cooling, after viewing plates as described below are secured as covers on the access openings by means of the blindtapped holes previously described.

FIG. 4 shows cam 46 and cam shaft 48 and cam follower discs or plates 70 as seen axially of the shaft.

Figure 5:
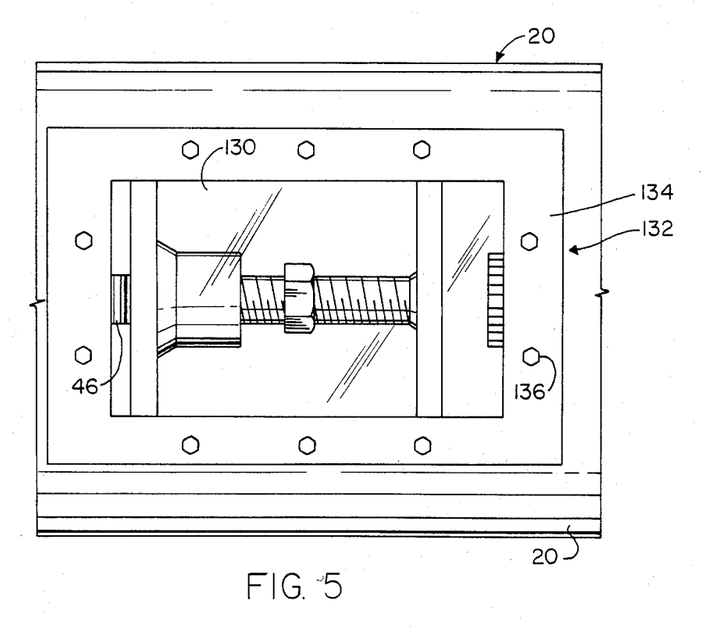
FIG. 5 is a view looking through a window at a portion of a mechanism like that shown in FIG. 4 but on the other side of centerline.

FIG. 5 shows a view of similar but opposite-side details as seen through the transparent plastic 130 (Plexiglass) of a cover plate 132 which includes an oil-tight frame 134 holding to the housing 20 by means of bolts 136 in the threaded holes previously described. Visual access to the cam 46 and other features including oil level is good. (FIG. 1 shows access openings 38, 40).

Figure 6:
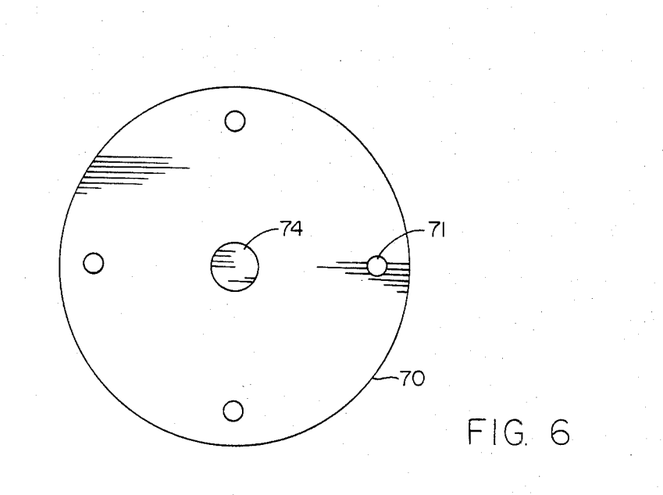
FIG. 6 is a view taken at 6—6, FIG. 3.

FIG. 6 shows a face view of cam follower disc 70 and the threaded adjustment rod 74. Holes 71 provide for wrenching.

Figure 7:
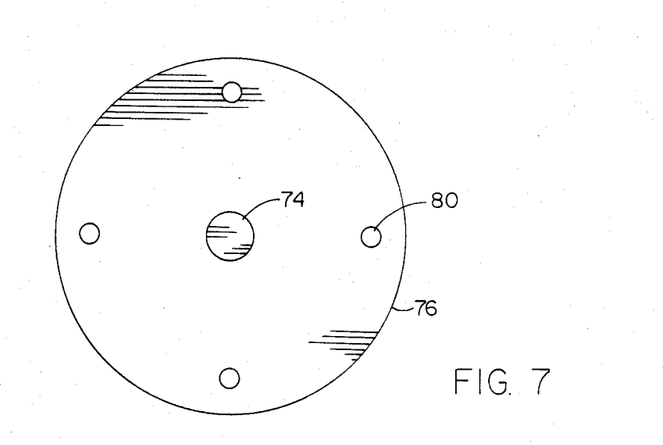
FIG. 7 is a view adapted from 7—7, FIG. 3.

FIG. 7 shows a face view of the spreader plate 76 with holes in it for the rods, and the threaded shaft 74 welded to it. Only two of the equally spaced holes 80 are necessary but four would be preferred for assembly purposes, for wrenching for example.

Figure 8:
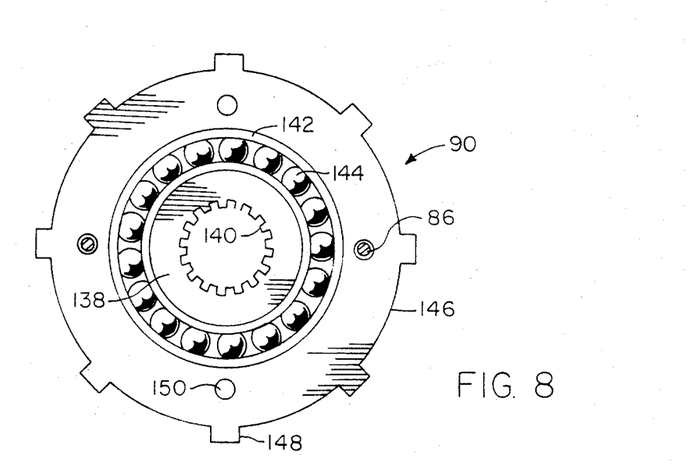
FIG. 8 is a view adapted from 8—8, FIG. 3.

FIG. 8 is a face view of an axle carrier bearing assembly or first bearing assembly 90, which may be representative of all four of these. The inner race 138 has splines 140 for fitting the axle splines.

The outer race 142, conventionally carried by antifriction members such as balls or rollers 144, may be pressfitted in a spline ring 146. The spline ring has splines 148 contoured for engaging the housing-bore splines and has four clearance holes 150 longitudinally through it permitting free-sliding passage through it of the pressure plate rods 86 but too small for passage of the springs. If desired, these holes may be omitted from the spline rings for the two outboard axle carrier bearing assemblies or second bearing assemblies (104, FIG. 3).

Figure 9:
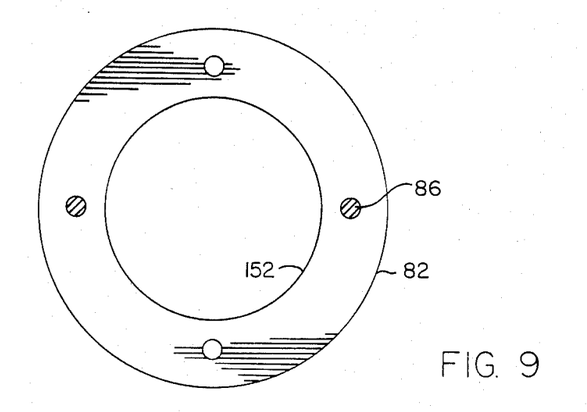
FIG. 9 is a view adapted from 9—9, FIG. 3.

FIG. 9 is a face view of a pressure plate 82 with axle clearance bore 152, housing spline-clearance outer circumference, and pressure rods 86.

Figure 10:
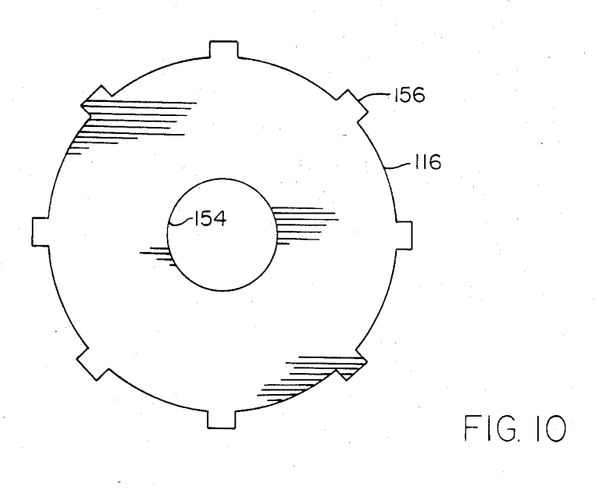
FIG. 10 is a view adapted from 10—10, FIG. 3.

FIG. 10 shows a face view of a typical housing brake-disc 116 with bore 154 dimensioned for clearing the stub axle and with splines 156 on the outer circumference proportioned for engaging the housing splined structure.

Figure 11:
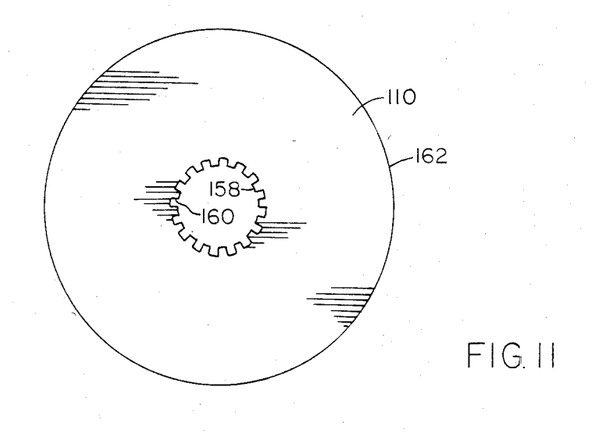
FIG. 11 is a view adapted from 11—11, FIG. 3.

FIG. 11 shows a face view of an axle brake-disc 110 with bore 158 having splines 160 for engaging a stub axle and circumference 162 dimensioned for clearing the housing bore.

The axle brake discs may be made of steel and the housing brake discs may be made of brass.

From the above it will be appreciated that means for compressing together said array of discs include the two-lobe cam and means rotatably mounting it, means rotating it to exert equal force in the two axially opposite directions along the bore of the housing, the bearing assemblies and snap-ring provisions affixing them to the housing; the cam disc, pressure plate, spreader plate and connecting threaded member, rods, and springs.

It will be appreciated that this mechanism is repeated in opposed relation on opposite sides of the transverse centerline of the system and with the uniform wall thickness, uniform diameter circular-section of the housing or tubular member provides for economy, interchangeability and flexibility in mounting, as well as adaptation to suit various-size systems.

ASSEMBLY AND ADJUSTMENT

Assembly and adjustment are easy and quick. First, the cam plate/spring plate subassemblies are inserted. Each inboard axle-carrier bearing assembly may then be secured in place with the snaprings. Then the pressure rods of each pressure plate may be inserted, and the springs and nuts applied through the access windows. The cam is then inserted through an access window, the cam shaft inserted through the cam and the cam pinned or set-screwed to it.

The shaft nipple or sleeve is then screwed in and end thrust adjusted. The remainder of the assembly is then done through the housing ends, and the spindles, gaskets and wheels are attached.

A conventional crank arm is pinned or bolted to the shaft to turn it from the point of control (tractor seat) by mechanical or pneumatic or by hydraulic or by electric power unit (such as a piston assembly or solenoid). The brakes are then applied and released repeatedly and any adjustments are made using the threaded adjustment shafts. The cover plates are then applied and the unit supplied with oil through any convenient sealable opening such as a pipe-plug opening, not shown.

The system preferably is installed with the cam shaft pointing up, but it can be oriented in any convenient direction. Since the housing exterior is circular except at the shaft and windows, it can be clamped to vehicle springs in any orientation.

The system can be built in any size wanted. A size to fit a forty foot semi-trailer would be:
  overall length of housing: 58 inches (1.5 m)
  outside diameter of housing: 8.5 inches (21 cm)
  inside diameter of housing: 6 inches (15 cm)
  other dimensions are generally to scale

OPERATION

FIG. 3 best shows the interconnection for operation. Operation on each side of centerline is the same as the following.

When the operator desires to apply brakes he actuates any suitable means "D" turning the cam shaft 48, causing the cam 46 to turn, thrusting apart cam follower plates 70 which thrust respective pressure plates 82 against brake disc arrays 84 compressing the brake disc arrays against resistance of the outboard axle carrier bearing assembly 104 causing housing-engaging brake discs 116, 118, 120, 122 to bind axle-engaging brake discs 110, 112, 114 and brake each stub axle 85 and vehicle wheels attached to the stub axles.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Patent is:

1. In a system for braking vehicle axle-attached wheels and including a stub-axle-in-housing mechanism, a first array of discs, a second array of discs, first means for attaching a first plurality of discs of each of said first and second arrays of discs to said axle, second means for attaching a second plurality of discs of each of said first and second arrays of discs to said housing, and means for releasably compressing together each of said first and second arrays of discs for braking, the improvement comprising: means providing for all said means for attaching discs to be means for slidably attaching, said axle comprising a first stub axle and a second stub axle, each of said first and second stub axles having an inboard end and an outboard end, said housing containing said first array of discs about said first stub axle and containing said second array of discs in axially spaced relation thereto about said second stub axle, means for mounting a respective wheel on each outboard end of the stub axles, said means for releasably compressing including said system having a transverse centerline, and a two-lobe cam symmetrically disposed on said transverse centerline, means rotatably mounting said two-lobe cam and means for rotating said two-lobe cam and exerting equal force in opposite directions simultaneously along said housing, said means providing for all said means for attaching to be means for slidably attaching including said first plurality of discs having splined bores and said first and second stub axles having respective splined portions proportioned for slidably engaging said splined bores, said means providing for all said means for attaching to be means for slidably attaching further including said second plurality of discs having splined peripheries and said housing having a splined bore portion proportioned for slidably engaging said splined peripheries, said means for releasably compressing including a respective first bearing assembly in each of said opposite directions along said housing, and means for affixing each said first bearing assembly to said housing, and said means for affixing including a respective snap-ring in a groove on each side of each said first bearing assembly.

2. In a system as recited in claim 1, each said first bearing assembly having an outer race and an inner race, said outer race having splines proportioned for engaging the housing splined bore portion and said inner race having splines proportioned for engaging a said stub axle splined bore portion.

3. In a system for braking vehicle axle-attached wheels and including a stub-axle-in-housing mechanism, a first array of discs, a second array of discs, first means for attaching a first plurality of discs of each of said first and second arrays of discs to said axle, second means for attaching a second plurality of discs of each of said first and second arrays of discs to said housing, and means for releasably compressing together each of said first and second arrays of discs for braking, the improvement comprising: means providing for all said means for attaching discs to be means for slidably attaching, said axle comprising a first stub axle and a second stub axle, each of said first and second stub axles having an inboard end and an outboard end, said housing containing said first array of discs about said first stub axle and containing said second array of discs in axially spaced relation thereto about said second stub axle, means for mounting a respective wheel on each outboard end of the stub axles, said means for releasably compressing including said system having a transverse centerline and a two-lobe cam symmetrically disposed on said transverse centerline, means rotatably mounting said two-lobe cam and means for rotating said two-lobe cam and exerting equal force in opposite directions simultaneously along said housing, said means providing for all said means for attaching to be means for slidably attaching including said first plurality of discs having splined bores and said first and second stub axles having respective splined portions proportioned for slidably engaging said splined bores, said means providing for all said means for attaching to be means for slidably attaching further including said second plurality of discs having splined peripheries and said housing having a splined bore portion proportioned for slidably engaging each splined peripheries, said means for releasably compressing including a respective first bearing assembly in each of said opposite directions along said housing, and means for affixing each said first bearing assembly to said housing, said means for releasibly compressing including in each of said opposite directions from the two-lobe cam, a cam disc and means for adjustably positioning the cam disc for receiving said force from the two-lobe cam, and a pressure plate.

4. In a system as recited in claim 3, the pressure plate positioned for exerting pressure on a disc of said first and second array of discs, means for releasing said releasable compressing comprising: a second bearing assembly, means locating the second bearing assembly between the cam disc and the pressure plate, a spreader plate, said means for adjustably positioning comprising a threaded member connecting the cam disc and the spreader plate and a plurality of rods connecting the spreader plate and the pressure plate, and means resiliently urging the spreader plate away from the second bearing assembly.

5. In a system as recited in claim 4, said plurality of rods passing through a portion of said second bearing assembly.

6. In a system as recited in claim 3, said system being symmetrical about said transverse centerline.

7. In a system as recited in claim 6, said housing being a circular-section tubing with a uniform wall thickness and diameter.

8. In a system as recited in claim 7, at least one window at a middle portion of said circular tubing.

9. In a system as recited in claim 8, and a transparent covering over said at least one window.

* * * * *